Nov. 17, 1959     L. SLOAN     2,913,287
SECTIONALIZED BEARING AND SEAL FOR CAR JOURNAL BOXES
Filed April 25, 1956     3 Sheets-Sheet 1
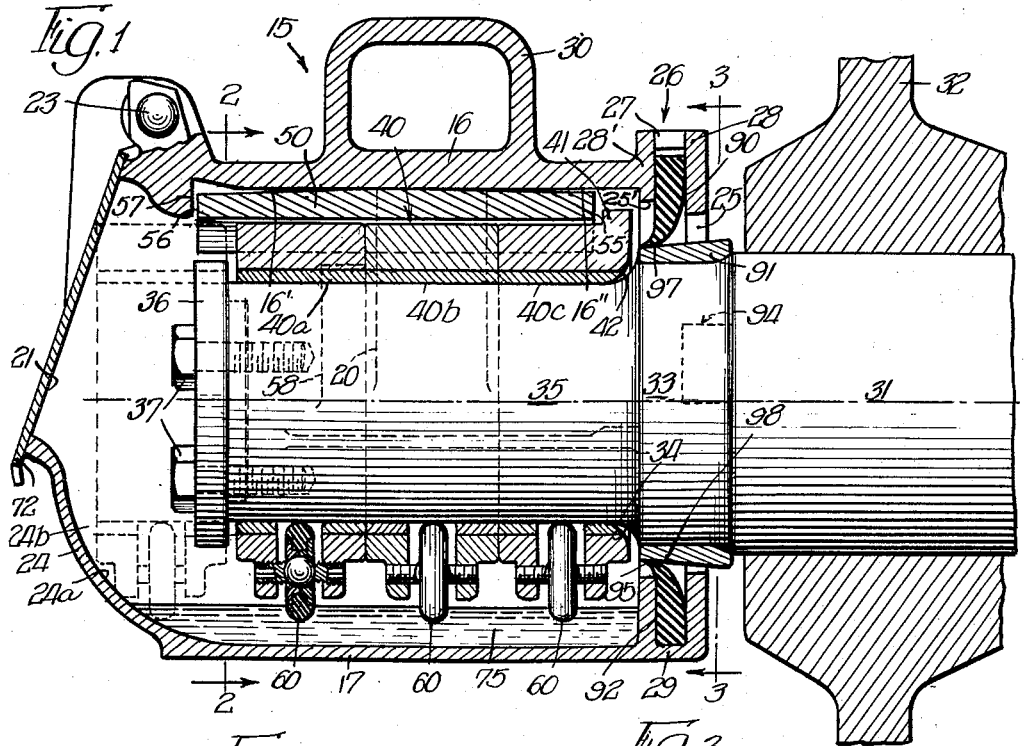
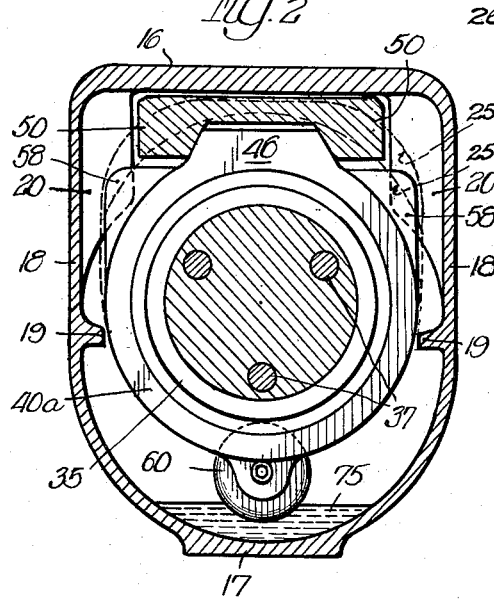
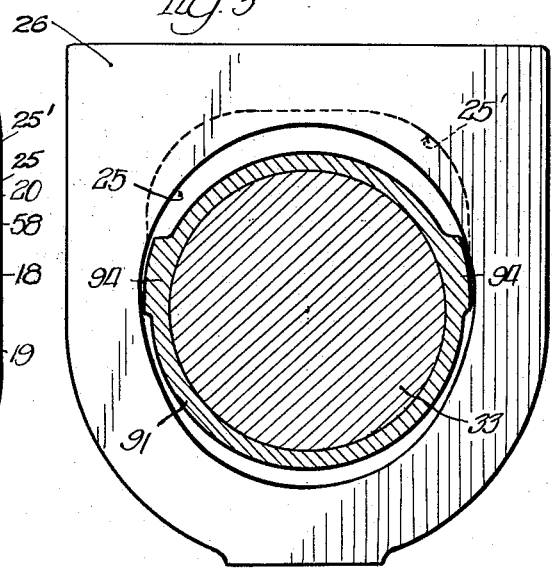
INVENTOR.
Lon Sloan,
BY Brown, Jackson,
Boettcher & Dienner
Attys

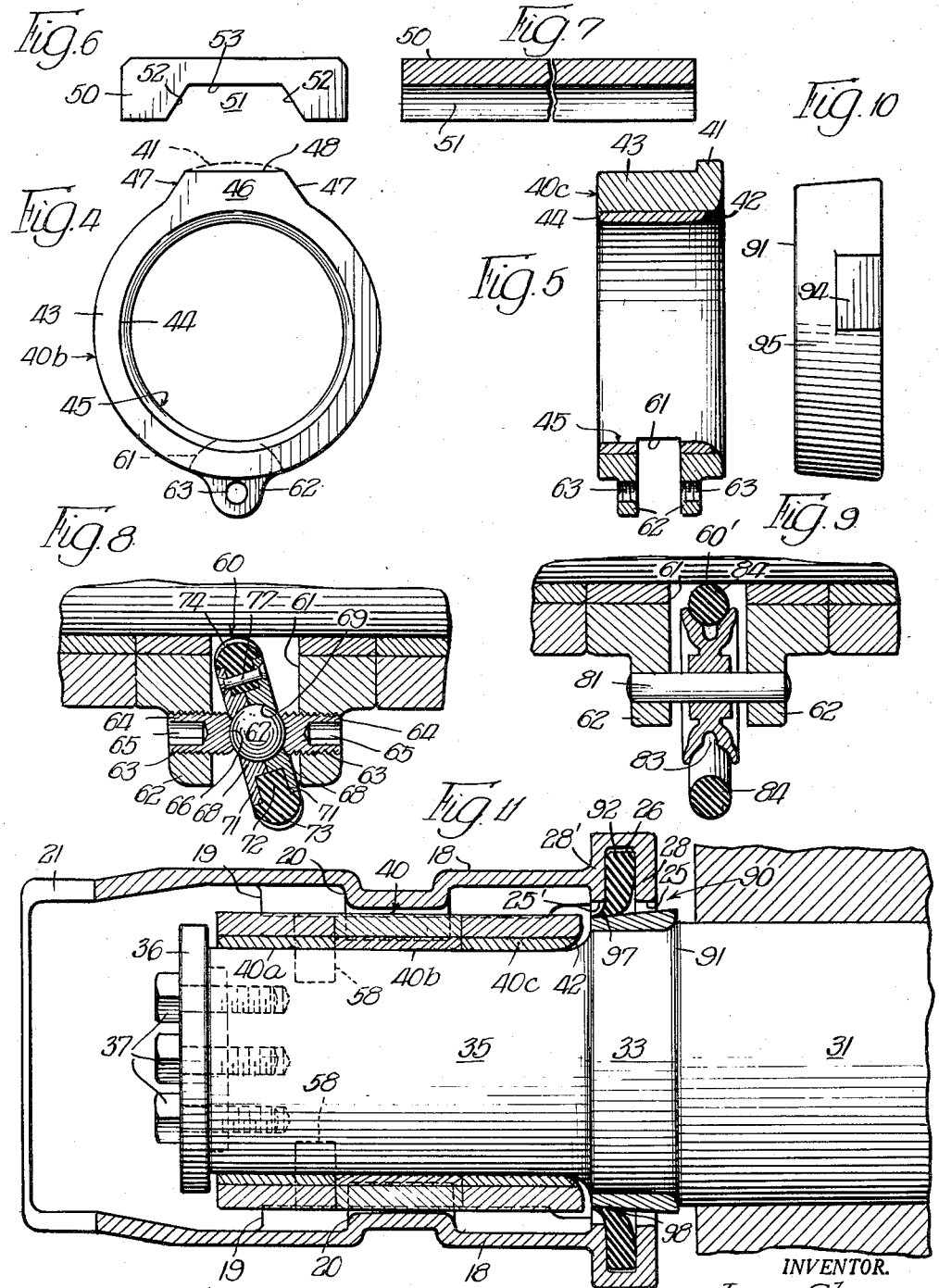

Nov. 17, 1959 L. SLOAN 2,913,287
SECTIONALIZED BEARING AND SEAL FOR CAR JOURNAL BOXES
Filed April 25, 1956 3 Sheets-Sheet 3
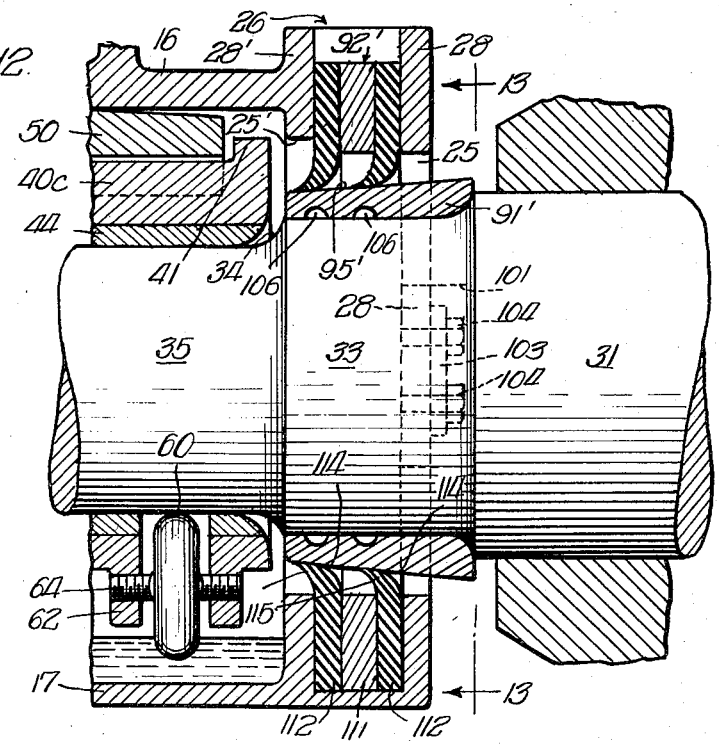
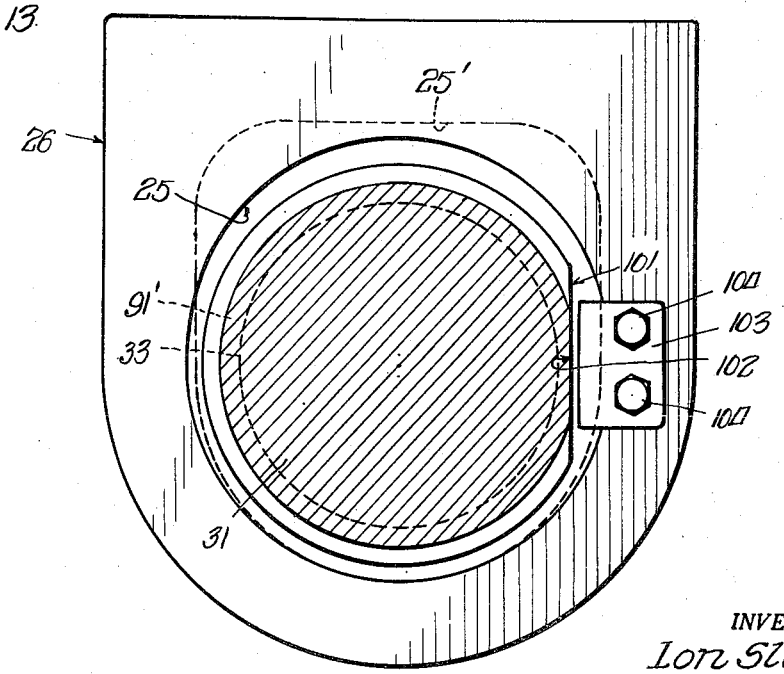
INVENTOR.
Lon Sloan,
BY Brown, Jackson,
Boettcher & Dienner
Attys.

United States Patent Office 2,913,287
Patented Nov. 17, 1959

2,913,287

SECTIONALIZED BEARING AND SEAL FOR CAR JOURNAL BOXES

Lon Sloan, Washington, D.C.

Application April 25, 1956, Serial No. 580,526

15 Claims. (Cl. 308—90)

The present invention relates to an improved sectionalized bearing and seal for car journal boxes.

The primary object of the invention is to provide an improved sectionalized bearing to take the place of the conventional "brass" of the brass and wedge bearing combination now ordinarily employed in railway car journal boxes. My improved sectionalized bearing completely encircles the car journal or axle which eliminates bearing displacement or axle damage during humping of the car, coupling, starting, heavy braking, or the inverting of dump cars for the dumping of their loads. My improved bearing is sectionalized into a plurality of relatively short sections to permit their easy insertion through the outer lid opening of the journal box for assembly in side-by-side relation over the car journal. This enables the bearing sections to be inserted and removed from operative position in the journal box for inspection, repair or substitution of bearing sections without the necessity of separating the journal box and journal.

Another object of the invention is to provide a sectionalized bearing wherein each bearing section embodies improved lubricant applying means for picking up lubricating oil from the lower portion of the journal box and applying it to the car journal. This lubricant applying means preferably comprises a roller rotatably mounted in a notch or slot in the lower end of each bearing section, this roller being arranged for rolling contact with the under surface of the car journal. Each of these rollers has its lower peripheral portion immersed in a pool of lubricating oil in the bottom of the journal box, and whenever the car journal rotates each roller is also caused to revolve, whereby it picks up oil from the oil pool and applies it to the car journal.

Another object of the invention is to provide an improved oil seal and dust guard for the inner end of the journal box. This comprises a non-rotating sealing ring which has a relatively snug fit over the car journal substantially in the plane of the dust guard receiving well of the journal box, this sealing ring being held by the journal box against rotation with the car journal. This non-rotative sealing ring is preferably composed of bearing bronze, but, as will be later described, it may also be made of compositions having high compressive strength, and impact and oil resistant qualities, such as "Graphitar," "Insurok" or the like. Cooperating with this non-rotating sealing ring is a seal or guard composed of neoprene or other suitable oil-resistant pliable material, which has slidable mounting in the dust guard receiving well of the journal box. This pliable seal has a circular opening therein which snugly embraces the non-rotative sealing ring. The combination of the non-rotative sealing ring engaging over the journal, and the snug lip fitting of the pliable seal over this non-rotative sealing ring affords a very effective combined lubricant seal and dust guard at the inner end of the journal box. Heretofore, where the neoprene or rubber seal engaged the rotating surface of the car axle directly it was subject to rapid wear, tearing, etc. This is because the vibration and pounding occurring in the average journal box frequently brings the rough edges at the inner end of the journal box casting into forcible engagement against the rotating surfaces of the car axle, thus creating roughened abrasive surfaces on this portion of the axle, which rapidly wear or tear the pliable edge of the seal having direct contact therewith. However, by interposing the non-rotative bronze sealing ring between the car axle and the lip fitting of the pliable seal, the sealing ring takes the pounding against the rough edges of the journal box, and because this sealing ring is held against rotation any roughened surface created thereon cannot exert a tearing action on the encircling lip of the pliable seal.

Other objects, features and advantages of the invention will appear from the following detail description of one preferred embodiment thereof. In the accompanying drawings illustrating said embodiment:

Figure 1 is a vertical axial sectional view of a car journal box with the car axle shown in elevation, and with my improved sectionalized bearing and seal shown in section;

Figure 2 is a transverse sectional view taken approximately on the plane of the line 2—2 of Figure 1, showing my improved sectionalized bearing;

Figure 3 is a transverse sectional view taken approximately on the plane of the line 3—3 of Figure 1, showing my improved seal;

Figure 4 is a front or end elevational view of one of my improved bearing sections or bearing rings;

Figure 5 is an axial sectional view of the innermost bearing section;

Figure 6 is an end elevational view of the bearing wedge;

Figure 7 is a fragmentary longitudinal section of the same;

Figure 8 is an axial sectional view of one of the lubricating rollers on a larger scale;

Figure 9 is a similar view of a modified construction of roller;

Figure 10 is a side elevational view of the sealing ring or sleeve;

Figure 11 is a horizontal sectional view through the journal box with my improved sectionalized bearing and seal assembled therein.

Figure 12 is a fragmentary axial sectional view illustrating a modified construction of guard sealing ring and a modified construction of sealing partition; and Figure 13 is an inner end elevational view of the journal box showing the locking lug secured thereto which holds the modified construction of sealing ring against rotation, corresponding to a section taken approximately on the plane of the line 13—13 of Figure 12.

My improved sectionalized bearing and seal are intended for use in any of the conventional designs of railway journal boxes approved by the Association of American Railroads and in common usage at the present time. Such a journal box is indicated at 15 in Figure 1, and comprises a top wall 16, a bottom wall 17 and side walls 18. In some instances, the side walls 18 are formed with conventional waste retaining ribs 19 and inwardly projecting vertical ribs 20 for retaining the conventional bearing parts. The outer end of this journal box is provided with an outer opening 21, which is normally closed by a suitable lid or cover 22 which is spring hinged to the box at 23. A curved lower front wall 24 extends from the lid opening 21 down to the bottom wall 17. The inner end of the journal box is provided with an opening 25 for receiving the wheel axle, and also formed in this inner end is the conventional dust guard well or slot 26 having an open top 27, parallel side walls 28, 28' and a bottom wall 29. The inner opening 25 passes horizontally through this dust guard well or slot 26. The journal box 15 may be cast integral with the truck frame, as indicated by the truck frame section 30, or it may be made separate therefrom.

The car wheel axle 31 carries the car wheels 32, and each end of this axle comprises a first reduced portion 33 lying substantially in the transverse plane of the dust guard well 26, and a second reduced portion 35 constituting the journal which has bearing support in the journal box 15. Detachably secured to the outer end of the journal portion 35 is a removable outer head collar or end head 36, which is fastened to the journal by cap screws 37 threading into tapped holes in the journal. The cap screws 37 and collar 36 can be removed and replaced through the outer lid opening 21 in the journal box.

My improved sectional bearing, designated 40 in its entirety, comprises three ring-like sections 40a, 40b and 40c which are adapted to be asembled in side-by-side relation on the journal or axle portion 35. As shown in Figure 4, each of the bearing sections comprises a ring-shaped casting 43, preferably composed of bronze, in which there is a bearing liner 44, preferably composed of babbitt. This babbitt liner has a bore or internal diameter 45 having a rather snug fit over the cylindrical journal 35, but which has sufficient tolerance for a running fit (of approximately .010 inch or so) which facilitates sliding the bearing sections on and off the journal 35. The top portion of each ring-shaped casting 43 is provided with an upwardly projecting aligning or keying rib 46 of wedge-shaped cross-section having sloping sides 47 and a flat top 48. Fitting into the upper portion of the journal box above the three bearing sections 40a, 40b and 40c is a bearing "wedge" 50. Formed longitudinally in the under side of this bearing wedge 50 is a key receiving pocket or groove 51 of wedge-shaped contour having sloping sides 52 and a flat upper surface 53 corresponding to the sides 47 and flat top 48 of the keying or aligning ribs 46 projecting upwardly from the tops of the three bearing sections. The top surface of this bearing wedge is in load bearing engagement with the top wall 16 of the journal box, and the pocket or groove 51 of wedge-shaped contour in the underside of the wedge 50 is in load bearing engagement with the aligning ribs 46 on the top sides of the three bearing sections 40a, 40b and 40c. Thus, the bearing wedge 50 functions to transmit such car weight as is effective on the journal box 15 in a downward direction to the three bearing sections 40a, 40b and 40c substantially equally, and these in turn transmit the weight to the car journal 35. The sides of this bearing wedge 50 are adapted to abut the inwardly projecting ribs 20, with proper clearance for assembly and removal, where the bearing wedge 50 also positively holds the bearing sections 40a, 40b and 40c against rotation with the car journal 35. As shown in Figure 1, the inner surface of the top wall 16 is sloped upwardly over each end of the bearing wedge 50, as shown at 16' and 16'', to permit either end of the bearing wedge to rock upwardly in adapting itself to horizontal alignment between the journal box 15 and the journal 35. As also shown in Figure 1, a thrust sustaining stop shoulder 57 projects downwardly from the outer end of the top wall 16 of the journal box in position to function as a limit stop for limiting shifting or creeping of the bearing wedge 50 in an outward direction. Axial shifting of the axle in an outward direction is thus limited by the fillet 42 abutting the inner end of inner bearing section 40c, by the thrust transmitting shoulder 41 on inner bearing section 40c abutting the thrust sustaining shoulder 55 at the inner end of the wedge 50, and by the thrust transmitting shoulder 56 at the outer end of the wedge 50 abutting the thrust sustaining shoulder 57 in the box. Axial shifting in the other direction is limited by the provision of two thrust transmitting shoulders 58 projecting outwardly from the upper half of the rear of outer bearing section 40a. These lugs or ears 58 are adapted to abut the front sides of the inwardly projecting thrust sustaining shoulders or box ribs 20 when the axle shifts inwardly whereby axial shifting in this direction is limited by the collar 36 engaging the outer bearing section 40a, and by the thrust transmitting shoulders 58 on this bearing section engaging the thrust sustaining box ribs 20.

Referring now to the lubricating rollers 60 with which each bearing section 40a—40c is provided, it will be seen from Figures 4 and 5 that each bearing section is provided with a slot or notch 61 in its bottom portion which extends through the babbitt liner 44 to expose the lower surface of the car journal 35. Formed as downward extensions of each ring casting 43 on each side of the slot or notch 61 are mounting lugs 62. Aligned threaded bores 63 in these mounting lugs 62 receive screws 64, which are preferably comparable to Allen head setscrews. That is to say, the outer ends of these screws have polygonal sockets 65 for receiving an appropriate wrench, and the inner ends of these screws have spherical sockets 66. Mounted between the spherical sockets 66 of the opposing screws 64 is a metallic ball 67, preferably of steel. The lubricating roller 60 is mounted on this ball 67 for rotary motion and also for sidewise tilting motion, as shown in Figure 8. The hub of the roller 60 is made up of two identical hub sections 68, 68 having spherically shaped inner cavities 69 which match together over a diametrical plane of the ball 67. The hub sections 68, 68 have outwardly extending spaced side flanges 71 between which extends a medial tongue 72 constituting part of a pliable outer tread 73. This tongue 72 and tread 73 are preferably composed of neoprene, but they might be composed of other suitable oil resistant pliable material. The tread 73 has a substantial compression engagement against the under surface of the journal 35 where it is exposed in the notch 61. This causes each roller 60 to revolve directly with the journal 35, in either direction of rotation of the journal. In consequence, the outer periphery of each roller carries oil from the oil pool 75 in the bottom of the journal box up into wiping contact with the under surface of the journal 35. If desired, the outer surface of the tread 73 may be provided with angularly spaced transverse grooves or notches 74 for carrying additional amounts of oil from the oil pool 75 up into contact with the under surface of the journal 35. Referring again to the construction of the roller 60, rivets 77 pass through the side flanges 71 and tongue 72 for securing the roller assembly together, the roller being permanently assembled over the ball 67 by the rivets 77. Relative rotation and sidewise tilting motion of the roller assembly is preferably arranged to occur between the hub assembly 68, 68 and the ball 67 by permitting slight play between the spherical socket 69 and the ball. The ability of the lubricating roller to tilt laterally to either side accommodates axial shifting motion of the journal 35 inwardly or outwardly in the bearing sections 40a—40c as the car travels around curves or over switches, thereby minimizing wear of the outer tread surface 73. The lower portion of each lubricating roller 60 dips substantially into the pool of lubricating oil 75. If desired, the lubricating rollers 60 may be made of larger diameter to dip deeper into the oil sump 75.

In Figure 9 I have illustrated a modified construction of lubricating roller 60'. In this construction a bearing pin 81 extends transversely between the mounting lugs 62 which project downwardly from the bearing ring casting 43. Rotatably and slidably mounted on this bearing pin 81 is the roller 60' which has a groove 83 in its periphery. Loosely rolling in this groove 83 is a ring 84 of circular or rectangular cross-section, the groove 83 in the roller 60' being of similar cross-sectional contour. The ring 84 may be composed of a pliable material, such as neoprene or the like. It will be noted that the ring 84 is of substantially larger diameter than the roller 60', as a result of which only the upper portion of the ring rolls in the groove 83, the lower portion of the ring hanging below the bottom portion of the roller, immersed in the oil pool 75. The upper portion of the ring 84 rolls in firm compressive engagement against the under side of the journal 35. The ability of the roller 60' to slide axially along the bearing pin 81 accommodates the lubricating roller to inward and outward shifting movement of the journal 35 in the bearing sections 40a—40c. It will be noted that because of the sectionalized construction of the bearing 40, each of the three lubricating rollers 60 (Figure 8), or each of the three lubricating rings 60' (Figure 9), rotates entirely independently of the other rollers or rings in the series, so that any sticking or binding of one roller or ring will not disturb the free rotation of the other rollers or rings.

In the operation of inserting the sectionalized bearing 40 into the journal box 15 over the journal 35, the truck frame or journal box is jacked up until the journal box has been elevated into a bearing assembly position slightly higher than its normal position, relatively to the wheel journal 35. At this time, the collar 36 is removed from the outer end of the wheel journal 35, and the bearing wedge 50 is also removed from the journal box. Thereupon the innermost bearing section 40c is inserted through the outer lid opening 21 of the journal box, substantially into the inserting position shown in dotted lines in Figure 1, which inserting position lies between the outer end of the wheel journal 35 and the front wall 24 of the journal box extending downwardly from the lid opening 21. Attention is directed to the fact that in conventional designs of journal boxes approved by A.A.R. there is an outward curvature 24a in this front wall 24, which defines a curved clearance space 24b between the outer wall 24 and the outer end of the journal 35. In the act of inserting each of the bearing sections 40a—40c, I utilize this clearance space to receive the lower end of each bearing section and to receive the mounting lugs 62 and lubricating roller 60 carried thereby. As previously described, the first bearing section 40c to be introduced has an upwardly extending thrust transmitting shoulder 41 at the top of its entering end, and this shoulder is enabled to clear the thrust sustaining shoulder 57 by lowering this first section 40c below its position of alignment with the journal 35 in the act of inserting said section, so as to enable the shoulder 41 to be hooked in back of the shoulder 57, whereupon the bearing section 40c is lifted back into a position of alignment with the journal 35. Alternatively, as another method of enabling the shoulder 41 to clear the shoulder 57, the journal box 15 can be jacked up slightly higher than its usual bearing assembly position to enable the shoulder 41 to be placed in back of the shoulder 57, whereupon the journal box can be lowered back down to its usual bearing assembly position. The thrust transmitting shoulder 41 serves to limit outward axial shifting of the journal 35 within the journal box 15 by outward abutment against the thrust sustaining shoulder 55 at the inner end of the bearing wedge 50, and by outward abutment of the thrust transmitting shoulder 56 at the outer end of the bearing wedge against the thrust sustaining shoulder 57. If other means is provided to limit outward shifting of the journal 35, the thrust transmitting shoulder 41 may be eliminated. The bore of the first bearing section 40c has a rounded entering end 42 to accommodate the fillet 34 between the first and second reduced portions 33 and 35 of the wheel axle.

After the shoulder 41 of the first bearing section 40c has been hooked in back of the shoulder 57, with the lower portion of the bearing section disposed in the clearance space 24b, this bearing section 40c is slid inwardly along the journal 35 until the entering end 42 of the bore engages the fillet 34. Thereupon, the bearing wedge 50 is inserted into the space between the top of the first bearing section 40c and the top wall 16 of the journal box 15. In view of the fact that the other bearing sections 40a and 40b have not been inserted as yet, there is ample space for introducing the bearing wedge 50 at a slight upwardly inclined angle between the first bearing section 40c and the top wall of the journal box, following which the outer end of the bearing wedge 50 is lifted substantially to its normal horizontal position in back of the stop shoulder 57. Following the insertion of the bearing wedge 50, the second and third bearing sections 40b and 40a are inserted in turn into the clearance space 24b and are then slid endwise over the wheel journal 35, to bring all three bearing sections 40a, 40b and 40c substantially into side-by-side endwise abutment on the wheel journal 35. Thereupon the end collar 36 is secured over the outer end of the wheel journal 35 by the cap screws 37, it being noted that the three bearing sections 40a—40c have substantial end play over the journal 35 between this outer collar 36 and the inner fillet 34 to accommodate inward and outward end thrust of the journal 35. As the concluding step in the bearing assembly operation, the journal box 15 is jacked down into normal position, with the weight of the car transmitted through wedge 50 and bearing sections 40a—40c to the wheel journal 35.

It will be seen from the foregoing that when my improved sectionalized bearing 40 is completely assembled over the wheel journal 35, there is no possibility of bearing displacement or journal damage during the coupling, starting, heavy braking or humping of the car, or during the inverting of invertible dump cars during the dumping of their loads. It will also be seen that the three lubricating rollers 60 perform a much more effective lubricating function than the conventional waste packing with its tendency to glaze, grab or separate from the journal. These three lubricating rollers 60, 60' are effective at any atmospheric temperatures encountered by the cars in service, and with any viscosity of oil.

Referring now to my improved seal which is located at the inner end of the journal box, this seal is designated 90 in its entirety and comprises a sealing ring or guard bearing 91 and a sealing partition 92, the sealing ring 91 encircling the first reduced section 33 of the car axle, and the sealing partition 92 being slidably mounted in the well 26 and encircling the sealing ring 91. The sealing ring or guard bearing 91 has a length substantially equal to the length of the first reduced portion 33 of the wheel axle 31, having a curved or rounded entrance opening corresponding to the fillet between the wheel carrying portion of the axle and the first reduced portion 33. Projecting outwardly from the outer periphery of this sealing ring at opposite sides thereof are segmental lugs 94 (Figures 3 and 10), which only protrude outwardly from the inner half of the length of the sealing ring 91, as indicated in side elevation in Figure 10. The outer half of the length of the sealing ring 91 extending outwardly in an axial direction from the ends of the lugs 94 is formed with a smooth sealing surface 95, either tapered or cylindrical, against which the lip 97 of the sealing partition 92 bears. The opening 25 in the inner end of the journal box 15 is of a larger diameter than the axle 31 and sealing ring 91, and this opening 25 is vertically elongated or has its center disposed eccentrically above the center of the axle 31, so that the sealing ring 91 is spaced more from the top of the opening 25 than it is from the bottom or sides of said opening. The lugs 94 projecting from the sealing ring 91 are inserted into the upper portion of the opening 25, in which they are readily receivable, these lugs being proportioned so that they cannot revolve down through the opening 25. Hence, the lugs 94 positively hold the sealing ring 91 against rotation with the car axle in either direction of rotation thereof. The other wall 28' of the well 26 has an opening 25' therein which has its upper portion extending upwardly above the upper portion of the other opening 25. In upward jolting of the car, or in the inverting of a dump type of car for unloading, the momentary upward or reverse load will be borne by the blocking lugs 94 engaging with the side walls of the opening 25, or by the bottom surface of the sealing ring 91 abutting against the bottom surface of the opening 25. It will be seen from the foregoing that the provision of the sealing ring 91 prevents the rough edges of the openings 25, 25' from roughening or abrading the reduced axle portion 33 as a result of jolting of the car in coupling, braking or humping of the car, or the inverting of an invertible dump type of car. Such roughening or abrasion that the openings 25, 25' may inflict on the outer surface of the sealing ring 91 can exert no tearing action on the sealing partition 92, because this sealing ring 91 does not rotate. This sealing ring 91 is preferably composed of a suitable bearing bronze, but it might also be made of "Graphitar," "Insurok," or any high compressive strength composition suitable to such use.

The sealing partition 92 has a substantially horizontal top edge, substantially vertical side edges, and a rounded bottom edge. The perimetrical portion of this sealing partition is of a thickness which snugly fills the dust guard well 26. This thickness tapers down to a thinner lip 97 which encircles the circular opening 98 adapted to fit over the circular sealing surface 95 of the non-rotative sealing ring 91. The opening 98 is slightly smaller than the exterior surface 95, so that the lip 97 is flexed laterally in its contact with the sealing surface 95. The lip 97 can flex laterally to face in either direction with the inward and outward axial shifting of the journal within the journal box. The sealing ring or guard bearing 91 can be readily removed and replaced, for inspection, repair or substitution, by first removing the bearing sections 40a—40c and bearing wedge 50, and then removing the guard bearing 91 out through the lid opening 21.

In Figures 12 and 13, I have illustrated a modified construction of guard sealing ring, designated 91', and a modified construction of sealing partition, designated 92'. The modified guard bearing ring 91' is constructed substantially the same as the sealing ring 91, except that it is formed with a flat spot 101 cast or machined in its outer surface. This flat spot 101 is confined to the inner half of the length of the sealing ring 91', in the same manner that the lugs 94 are confined to the inner half of the sealing ring 91. Engaging with the flat spot 101 is the straight edge 102 of a clip 103 which is secured by bolts 104 to the inner face or end of the journal box. The engagement of the flat spot 101 with the clip 103 holds the sealing ring 91' against rotation, while permitting endwise axial movement of the sealing ring 91' with the car axle 31 relatively to the journal box. The bore of the sealing ring 91' is also shown as being provided with internal grooves 106 to afford additional lubricating and oil sealing functions.

The modified embodiment of sealing partition 92' is of sandwich construction, comprising a frame 111 composed of metal, plastic, plywood or fiberboard, to the opposite sides of which are cemented, riveted or otherwise secured two slabs or plies 112, 112 of soft neoprene, plastic or the like. The circular openings 114 in these plies 112 are formed with thin pliable lips 115 which flex laterally in their contact with the sealing surface 95' of the sealing ring 91'. The pliable outer surfaces of the two neoprene plies or slabs 112, 112 establish resilient pressure contact with the outer and inner walls 28, 28' of the dust guard receiving well 26, and the provision of the two sealing lips 115 doubles the effectiveness of the oil seal between the sealing ring 91' and the partition seal 92'.

While I have illustrated and described what I regard to be the preferred embodiments of my invention, nevertheless it will be understood that such are merely exemplary and that numerous modifications and rearrangements may be made therein without departing from the essence of the invention.

I claim:

1. In combination, a standard railway car journal box having the conventional lid covered opening in its outer end, a wheel axle having a journal extending into said journal box, a sectionalized non-rotatable plain bearing rotatably supporting said journal in said journal box, said sectionalized bearing comprising a plurality of ring-like non-rotatable plain bearing sections adapted to be inserted through said lid covered opening in the outer end of the journal box for axially aligned side-by-side mounting on said journal, an outer head collar of larger diameter than said journal detachably secured to the outer end of said journal after said bearing sections have been assembled thereon and a rotary lubricant applying device rotatably carried by at least one of said bearing sections and having its outer periphery pressed into frictional engagement with the undersurface of said journal so as to be rotatably driven thereby for applying lubricant to said journal.

2. In combination, a standard railway car journal box having the conventional lid covered opening in its outer end, a wheel axle having a journal extending into said journal box, a sectionalized bearing rotatably supporting said journal in said journal box and adapted to be inserted into operative bearing position between said journal and journal box without requiring removal of said journal from said journal box, said sectionalized bearing comprising a plurality of ring-like bearing sections adapted to be inserted through said lid covered opening in the outer end of the journal box for axially aligned side-by-side mounting on said journal, an outer head collar of larger diameter than said journal detachably secured to the outer end of said journal after said bearing sections have been assembled thereon and a lubricant applying roller carried by at least one of said bearing sections adapted to receive rotary motion from said journal by the periphery of said roller having direct rolling contact with the surface of the journal for picking up lubricant from a lubricant pool in the bottom of said journal box and applying it to said journal.

3. In combination, a standard railway car journal box having the conventional lid covered opening in its outer end, a wheel axle having a journal extending into said journal box, a sectionalized bearing rotatably supporting said journal in said journal box and adapted to be inserted into operative bearing position between said journal and journal box without requiring removal of said journal from said journal box, said sectionalized bearing comprising a plurality of ring-like bearing sections adapted to be inserted through said lid covered opening in the outer end of the journal box for axially aligned side-by-side mounting on said journal, a lubricating slot formed in the lower portion of at least one of said bearing sections for exposing the lower surface of said journal therethrough, a lubricating roller rotatably mounted in said slot with its periphery bearing against the lower surface of said journal whereby said roller receives rotary motion by direct frictional drive from said journal for picking up lubricant from a lubricant pool in the bottom of said journal box and applying it to said journal, and thrust transmitting shoulders on said sectionalized bearing and cooperating thrust sustaining shoulders in said journal box operative to resist relative end thrust between said journal box and said journal in both inward and outward directions.

4. In combination, a standard railway car journal box having the conventional lid covered opening in its outer end, a wheel axle having a journal extending into said journal box, a sectionalized bearing rotatably supporting said journal in said journal box and adapted to be inserted into operative bearing position between said journal and journal box without requiring removal of said journal from said journal box, said sectionalized bearing comprising three or more ring-like bearing sections adapted to be inserted through said lid covered opening in the outer end of the journal box for axially aligned side-by-side mounting on said journal, a lubricating slot formed in each of said bearing sections for exposing the lower surface of said journal therethrough, separate independently rotating lubricating rollers mounted for rotary and lateral motion in each of said slots, said independent rotary motion being imparted to the periphery of each of said rollers by direct frictional drive received from said journal, said lateral motion being imparted to said rollers by axial shifting motion of said journal in said journal box, and means for limiting such axial shifting motion comprising an outer head collar of larger diameter than said journal rigidly secured to the outer end of said journal.

5. In combination, a railway car journal box having a lid covered opening in its outer end, a wheel axle having a journal extending into said journal box, a sectionalized bearing rotatably supporting said journal in said journal box, said sectionalized bearing comprising a plurality of ring-like bearing sections adapted to be inserted through said lid covered opening in the outer end of the journal box for axially aligned side-by-side mounting on said journal, a lubricating slot in the lower portion of at least one of said bearing sections, a ball mounted in said slot, and a lubricating roller mounted on said ball for rotary and lateral tilting motion and having frictional contact with the under surface of said journal, the lower portion of said roller dipping into an oil pool in the bottom of said journal box, said roller having rotary motion transmitted thereto from the rotary motion of said journal, and having lateral tilting motion transmitted thereto from the axial shifting motion of said journal in said journal box.

6. In combination, a railway car journal box having a lid covered opening in its outer end, a wheel axle having a journal extending into said journal box, a sectionalized bearing rotatably supporting said journal in said journal box, said sectionalized bearing comprising a plurality of ring-like bearing sections adapted to be inserted through said opening in the outer end of said journal box for axially aligned side-by-side mounting on said journal, a lubricating slot formed in the lower portion of at least one of said bearing sections for exposing the lower surface of said journal therethrough, a roller rotatably mounted in said lubricating slot, and a lubricating ring of larger diameter than said roller having its upper portion rolling on the upper portion of said roller in contact with said journal and having its lower portion hanging below said roller in a lubricant pool in the bottom of said journal box.

7. In combination, a standard railway car journal box having the conventional lid covered opening in its outer end, a wheel axle having a journal extending into said journal box, a sectionalized bearing rotatably supporting said journal in said journal box and adapted to be inserted through said lid covered opening into operative bearing position between said journal and journal box without requiring removal of said journal from said journal box, said sectionalized bearing comprising a plurality of ring-like bearing sections adapted to be inserted through said opening in the outer end of said journal box for axially aligned side-by-side mounting on said journal, a bearing wedge engaging between said bearing sections and said journal box, cooperating keying surfaces on said bearing sections and on said bearing wedge for enabling said bearing wedge to hold said bearing sections against rotation, a shoulder on the innermost one of said bearing sections adapted to engage an inner shoulder on said bearing wedge for transmitting outward axial shifting thrust of said journal through said bearing sections to said bearing wedge, and means for transmitting such outward axial shifting thrust from said wedge to said journal box.

8. In combination, a standard railway car journal box having the conventional hinged lid opening in its outer end and having the conventional outer end wall extending downwardly from said opening to the bottom of the journal box, a car wheel axle having a journal extending into said journal box, a sectionalized bearing between said journal and journal box and adapted to be inserted through said lid covered opening into operative bearing position between said journal and journal box without requiring removal of said journal from said journal box, said sectionalized bearing comprising a plurality of ring-like plain bearing sections of such size and proportion that they can be inserted downwardly through said hinged lid opening and into the space between said outer end wall and the end of the journal for mounting on said journal in axially aligned side-by-side relation, a wedge operative between the upper portions of said ring-like bearing sections and the upper portion of said journal box, and cooperating keying surfaces on said bearing sections and on said wedge for transmitting the downward load from the journal box through said wedge to said bearing sections, and for also holding said bearing sections against rotation.

9. In combination, a standard railway car journal box having in its outer end the conventional inclined opening normally covered by a hinged lid and having the conventional outer end wall curving downwarly from the lower edge of said inclined opening to the bottom of the journal box, a car wheel axle having a journal extending into said journal box, a sectionalized bearing between said journal and journal box and adapted to be inserted through said lid covered opening into operative bearing position between said journal and journal box without requiring removal of said journal from said journal box, said sectionalized bearing comprising at least three ring-like bearing sections of such size and proportions that they can be inserted downwardly through said lid covered opening into the space between said outer end wall and the outer end of the journal for assembly on said journal in axially aligned side-by-side mounting, each of said bearing sections having a bearing liner therein adapted to have direct bearing contact with said journal, non-rotative retaining means between said journal box and said bearing sections, and cooperating keying surfaces on said bearing sections and on said non-rotative retaining means for holding said bearing sections and bearing liners against rotation with said journal.

10. In combination, a standard railway car journal box having the conventional lid covered opening in its outer end and having the conventional outer end wall extending downwardly from said opening to the bottom of the journal box, a wheel axle having a journal extending into said journal box, a sectionalized bearing rotatably supporting said journal in said journal box and adapted to be inserted through said lid covered opening into operative bearing position between said journal and journal box without requiring removal of said journal from said journal box, said sectionalized bearing comprising a plurality of ring-like bearing sections of such size and proportions as to be insertable downwardly through said lid covered opening and through the space between said outer end wall and the end of the journal for assembly in axially aligned side-by-side mounting on said journal, an end retainer head of larger diameter than the outer end of said journal secured to said journal end for retaining said bearing sections in their assembled mounting on said journal, a non-rotative bearing wedge disposed between the upper portions of said bearing sections and the upper portion of said journal box, and matching angular surfaces on said bearing wedge and on said bearing sections for transmitting the downward load from said journal box to said bearing sections, and for also holding said bearing sections against rotation.

11. In a sectionalized bearing adapted for insertion into bearing position between a standard railway car journal box and a car journal in said box without requiring removal of the journal from the box, the combination of a plurality of ring-like bearing sections of relatively short axial dimension insertable downwardly in succession through the front lid-covered opening of the standard journal box and into the space between the outer end of the journal box and the outer end of the journal for successive assembly in axially aligned side-by-side mounting on said journal while said journal remains in said journal box, a non-rotative bearing wedge mounted between the upper portions of said bearing sections and the upper portion of said journal box, and cooperating keying surfaces on said bearing sections and on said wedge for transmitting the downward load from said journal box to said bearing sections, and for also holding said bearing sections against rotation, said bearing wedge having an undersurface which is relatively smooth longitudinally of the wedge whereby after at least one of said bearing sections has been mounted on said journal said bearing wedge can be inserted with an endwise sliding motion through the outer open end of said journal box into an upper space between the top of said bearing section and the top portion of said journal box.

12. In a sectionalized bearing adapted for insertion into bearing position between a standard railway car journal box and a rotatable car journal in said box without requiring removal of the journal from the box, the combination of a plurality of ring-like bearing sections of relatively short axial dimension insertable downwardly in succession through the front lid-covered opening of the standard journal box and into the space between the outer end of the journal box and the outer end of the journal for successive assembly in axially aligned side-by-side mounting on said journal while said journal remains in said journal box, a non-rotative bearing wedge insertable independently of said bearing sections through said front opening of the journal box into an upper space in the top of said journal box, cooperating keying surfaces on said bearing sections and on said bearing wedge for keying said bearing sections against rotation, the entering end of said bearing wedge having a longitudinally smooth undersurface insertable with an endwise sliding motion through said front opening of said journal box, after one of said bearing sections has been thus assembled on said journal and an end retainer head of larger diameter than the outer end of said journal adapted to be secured to said journal end for retaining said bearing sections in their assembled mounting on said journal.

13. In a sectionalized bearing adapted for insertion into bearing position between a standard railway car journal box and a car journal in said box without requiring removal of the journal from the box, the combination of a plurality of ring-like bearing sections of relatively short axial dimension insertable downwardly in succession through the front lid-covered opening of the standard journal box and into the space between the outer end of the journal box and the outer end of the journal for successive assembly in axially aligned side-by-side mounting on said journal while said journal remains in said journal box, a lubricating slot formed in the bottom of each of said bearing sections, a separate independently rotating lubricating roller mounted in each of said lubricating slots and adapted to have its periphery bear in frictional rotating engagement against the underside of said journal for rotatably picking up lubricant from the bottom of said journal box and applying it to said journal, a bearing wedge insertable between the upper portions of said bearing sections and the upper portion of said journal box, matching sloping surfaces on said bearing sections and on said bearing wedge for transmitting the downward load from said journal box through said bearing wedge to said bearing sections, and for also holding said bearing sections against rotation, and an end retainer head of larger diameter than the outer end of said journal adapted to be secured to said journal end for retaining said bearing sections in their assembled mounting on said journal.

14. The combination of claim 11 wherein the innermost of said ring-like bearing sections carries a thrust transmitting shoulder which coacts with said bearing wedge for resisting axial thrusting motion of said journal in an outward direction in said journal box, and wherein the outermost of said ring-like bearing sections carries a thrust transmitting shoulder which coacts with a thrust sustaining shoulder in said journal box for resisting axial thrusting motion of said journal in an inward direction in said journal box.

15. In a sectionalized bearing adapted for insertion into bearing position between a standard railway car journal box and a rotatable car journal in said box without requiring removal of the journal from the box, the combination of a plurality of ring-like bearing sections of relatively short axial dimension insertable downwardly in succession through the front opening of the standard journal box and into the space between the outer end of the journal box and the outer end of the journal for successive assembly in axially aligned side-by-side mounting on said journal while said journal remains in said journal box, a non-rotative bearing wedge adapted to occupy a position between the top sides of said bearing sections and the upper portion of said journal box, said bearing wedge being insertable through said front opening of the journal box independently of the operation of inserting said bearing sections, and coacting keying surfaces on said bearing sections and on said bearing wedge for holding said bearing sections against rotation.

References Cited in the file of this patent

UNITED STATES PATENTS

| | | |
|---|---|---|
| 471,089 | Bassett | Mar. 22, 1892 |
| 812,915 | Berry | Feb. 20, 1906 |
| 901,866 | Atkinson | Oct. 20, 1908 |
| 1,989,110 | Penniman | Jan. 29, 1935 |
| 2,018,949 | Couch | Oct. 29, 1935 |
| 2,404,429 | Brittain | July 23, 1946 |
| 2,758,894 | Klingler | Aug. 14, 1956 |
| 2,785,020 | Browne | Mar. 12, 1957 |